United States Patent

Wysong

[15] 3,669,460
[45] June 13, 1972

[54] SCREW SEAL
[72] Inventor: Paul V. Wysong, Northridge, Calif.
[73] Assignee: Schrillo Company, Sepulveda, Calif.
[22] Filed: Feb. 22, 1971
[21] Appl. No.: 117,605

[52] U.S. Cl..............................277/24, 277/165, 277/167, 74/459
[51] Int. Cl.........................................................F16j 15/16
[58] Field of Search........................277/24, 167, 165; 74/459

[56] References Cited

UNITED STATES PATENTS

| 3,304,794 | 2/1967 | Bird | 74/459 X |
| 3,116,931 | 1/1964 | Edwards | 277/165 |
| 2,757,548 | 8/1956 | Smith | 74/459 X |
| 2,076,180 | 4/1937 | Griswold | 74/459 X |

FOREIGN PATENTS OR APPLICATIONS 693,131  7/1940  Germany.................................277/81

Primary Examiner—Samuel B. Rothberg
Attorney—Spensley, Horn & Lubitz

[57] ABSTRACT

A screw seal for providing a dynamic seal between a screw and a nut is disclosed. The seal which may be coupled to a nut, is incorporated within a carrier disposed about the screw and includes a chipping surface for shipping away foreign matter on the screw, a wiping surface for wiping the screw and sealing member which forms a seal between the nut and screw.

10 Claims, 8 Drawing Figures

PATENTED JUN 13 1972

PAUL V. WYSONG
INVENTOR.

BY
*Spensley, Horn & Lubitz*
ATTORNEY

PAUL V. WYSONG
INVENTOR.

BY
Spensley, Horn, & Lubitz
ATTORNEYS

A SCREW SEAL

BACKGROUND OF THE INVENTION

1. Field of the Invention

This invention relates to seals for use on a screw.

2. Prior Art

In numerous applications there is a requirement for a nut to smoothly and reliably move along a screw. Some of these applications require the nut and screw to carry large loads in extreme environmental conditions. Among these applications are recirculating ball screws which are often used in hostile environments such as those used to lower and raise the flaps on many commercial jet aircraft, tilt screws used in consumable electrode arc furnaces and screws used in boom hoisters. For these applications, in order to assure reliable operation it is desirable to have a seal between the nut and screw so that lubricants remain between the nut and screw and contaminants are kept from the working surfaces of the nut and screw. A seal, for performing these functions, would have to be a dynamic seal, that is, one which is capable of providing a seal which moves along the screw, typically at opposite ends of the nut.

No prior art seals provide the dynamic seal of the presently disclosed screw seal along with the chipping and wiping functions performed by the screw seal. The chipping and wiping functions prepare the screw for sealing with the nut and thereby ensure a dependable dynamic seal.

SUMMARY OF THE INVENTION

A screw seal for providing a dynamic seal between a screw and a nut is described. The screw seal is contained within a carrier which may be coupled to a nut, the carrier defining a cylindrical interior which is disposed about the screw. A chipping or scraping member extends from the interior of the carrier into at least one groove of the screw and scrapes or chips away foreign matter on the screw. A wiping member which engages at least one groove of the screw extends into the interior of the carrier and engages the groove of the screw thread and follows behind the chipper to wipe away any contaminants remaining on the screw. A seal, which is disposed within the screw groove and which extends helically along at least one turn of the screw is coupled to the interior of the carrier and follows behind the wiper as the screw seal advances along the screw. In a typical application one screw seal is disposed at each end of a nut and thus as the nut moves in either direction along the screw, or where the screw moves in either direction within the nut, a continuous seal is provided.

DETAILED DESCRIPTION OF THE INVENTION

Figure 1:
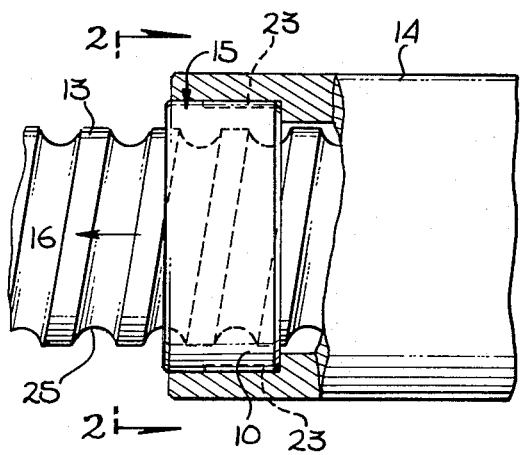
FIG. 1 illustrates the screw seal coupled to a nut wherein the nut and seal are engaging a screw.
Figure 2:
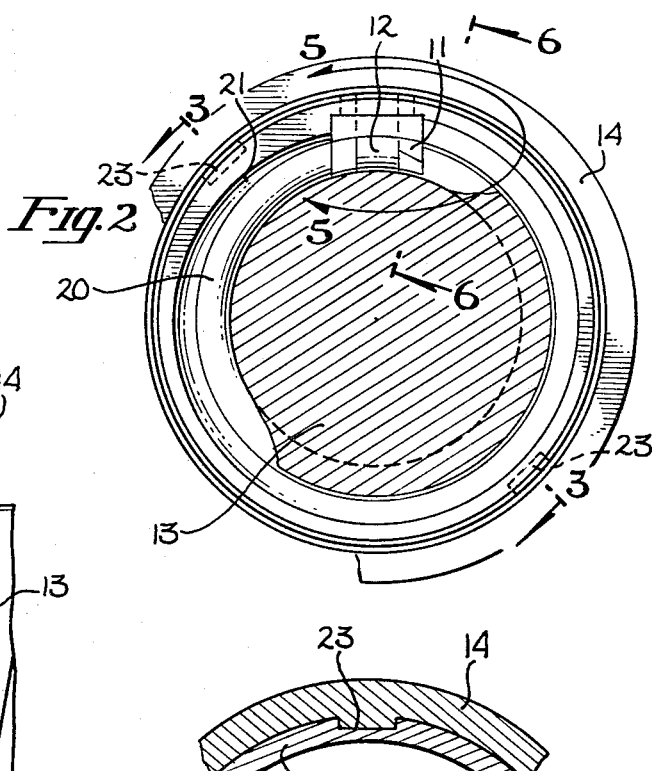
FIG. 2 is a cross-sectional view of the screw and screw seal of FIG. 1 taken along section line 2—2 of FIG. 1.

Referring to FIG. 1, a screw seal 15 built in accordance with the present invention is illustrated coupled to the end of a nut 14. The nut 14 cooperatively engages a screw 13; the portion of nut 14 which contains its threads is not illustrated. The various components which provide a chipping member, wiping member and sealing member are contained within the generally cylindrically shaped carrier 10. In a typical application a screw seal 15 would be disposed at opposite ends of the nut 14 to provide a seal between the nut 14 and screw 13. With a screw seal placed on opposite ends of nut 14 contaminants are prevented from entering the interior of the nut 14 and lubricants are contained within the interior of the nut 14, when the nut 14 is rotated in either direction and either advances along the screw 13 in the direction indicated by arrow 16 or in the opposite direction thereof. It will be obvious that the seal will operate equally well when the nut 14 is rotated upon the screw 13 or where the nut 14 is held stationary and the screw 13 is rotated.

Figure 4:
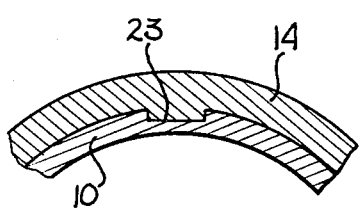
FIG. 4 is a partial cross-sectional view illustrating the coupling between the nut and the screw seal carrier taken along section line 4—4 of FIG. 3.

Referring to FIG. 4, one means by which the screw seal 15 may be held within the nut 14 is illustrated. A plurality of slots 23 which are disposed axially along the exterior of carrier 10 may be fitted within complementary members defined by the interior of the nut 14 at the ends of the nut. Any other suitable means may be utilized to secure the screw seal 15 to the nut 14.

Figure 8:
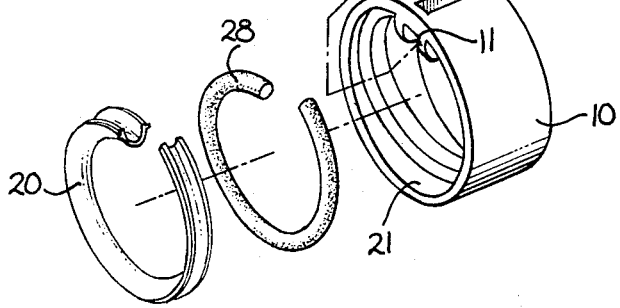
FIG. 8 is a perspective view of the various components which comprise the screw seal.

The various components which comprise the screw seal can best be seen in FIG. 8 and include the carrier 10, chipping members 11 defined by and extending to the interior of carrier 10 (see FIG. 6), a wiping member 12 and a sealing member 20. The seal spring 28 illustrated in FIG. 8 is a resilient member which is compressed between the sealing member 20 and the interior of carrier 10 such that member 20 is urged into the groove of the screw which it is engaging.

Referring to FIGS. 2, 3, 5, 6, 7, and 8, the carrier 10 defines a generally circular interior which is adaptable for being disposed axially about a screw. A pair of spaced-apart chipping members 11 (FIG. 2) are axially disposed within the interior of carrier 10 and extend radially into the interior or carrier 10. The opposite ends of each chipping member 11 are adaptable for closely fitting two adjacent grooves of a screw. The portion of the chipping members between its ends closely fits but does not engage the land of the screw disposed between said two adjacent grooves. The chipping members 11, which may be an integral part of the carrier 10 or which may braised or welded into the interior of carrier 10, in the presently preferred embodiment are a metal member. Approximately 0.005 inches of clearance (illustrated as space 29 in FIGS. 5 and 6) in the presently preferred embodiment exists between the groove 25 of a screw and the chipping members 11. The purpose of the chipping members is to chip or scrape contaminants or other foreign matter which may be located within the groove or on the land of the screw. Thus, as the seal advances along the screw, surface 22 of the chipping member 11 clears away foreign matter. Since the surface 22 is metal and relatively hard it is able to break away foreign matter and contaminants which may be adhered to the screw 13.

A slot 19 having a generally rectangular cross-section, is disposed through the carrier 10 (FIG. 8). This axially disposed slot defines an opening within the interior of carrier 10 between the two spaced-apart chipping members 11. The slot is utilized to hold the wiping member 12 between the chipping members 11. A seal seat 21 which comprises two spaced-apart parallel, helical ribs defines a channel. The ribs 21 extend from the end portion of the chipping member 11, exterior to slot 19, to the opposite end portion of the other chipping member 11, exterior to slot 19 in an adjacent groove. Thus, the seal seat 21, when the carrier 10 is engaging a screw, is disposed above the groove of a screw for approximately one turn of said screw. The seal seat 21 may be an integral part of the carrier 10 or may be braised or welded or otherwise held within the interior of the carrier 10.

A wiping member 12, most clearly seen in FIG. 8, includes a rectangular end 18 adaptable for engaging slot 19 of carrier 10 and two groove contact ends 24 for engaging adjacent grooves of a screw. The portion of the wiper member 12 between said groove contact ends 24 defines a channel through which the land of a screw may pass, or as illustrated. in the presently preferred embodiment the channel is shaped to contact and hence wipe the land between said adjacent grooves. The wiping member 12, when placed within slot 19 and when the screw seal is engaging a screw, is pressed or urged into adjacent grooves of the screw by a leaf spring 17 or other resilient means (see FIG. 7). The leaf spring 17 is held under tension within slot 19. Thus, as the nut 14 is advanced along the screw 13 the axially disposed surfaces of the ends 24 contact the grooves and wipe the grooves, thereby removing any foreign matter or contaminants adhering to the groove surface. It should be noted that as the screw seal 15 advances along the screw 13 in the direction of arrow 16 (FIG. 1) the chipping member 11 first removes the contaminants or foreign matter which it contacts and the remaining foreign matters or contaminants which pass between the chipping member 11 and the groove 25 will be wiped away by the wiping member 12 since it is in intimate contact with the groove 25. Also, as the nut is rotated on the screw, the surface of the wiping member 12, interior to the volume formed between the nut and screw, wipes any lubricant located therein which is on the screw, thereby causing the lubricant to be retained between the nut and screw. The wiping member 12 may be made from a material which is softer than the screw 13 so that it does not wear away the screw. A material such as polytetrafluoroethylene or one of the other polyimides have been found to be suitable for this application. The spring 17 ensures that the wiping member 12 continues to remain in intimate contact with the grooves of the screw even as wiping member 12 becomes worn.

Figure 3:
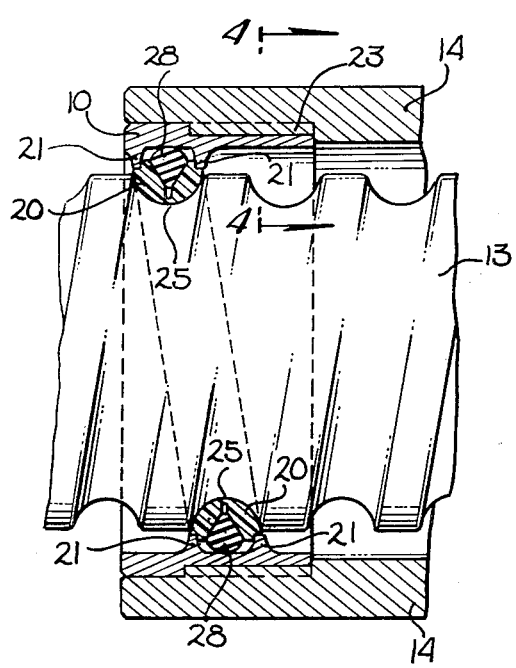
FIG. 3 is a cross-sectional view of the screw, screw seal and nut of FIG. 1 taken along section line 3—3 of FIG. 2.
Figure 6:
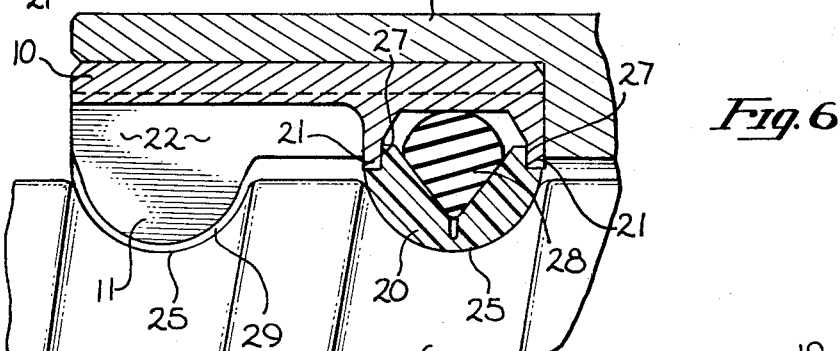
FIG. 6 is a partial cut-away exploded view of a portion of the screw seal, nut and screw taken along section line 6—6 of FIG. 2.
Figure 7:
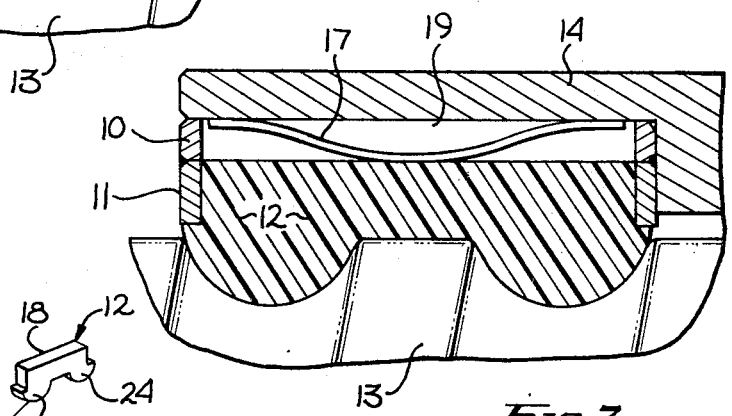
FIG. 7 is an exploded cross-sectional view of the screw seal, nut and screw taken through section line 7—7 of FIG. 5.

The sealing member 20 which is disposed within the channel defined by the seal seat 21 sealingly engages approximately one turn of the screw 13. Referring to FIGS. 3 and 6, the sealing member 20 is held within the spaced-apart ribs 21 and engages ridges 27 of the sealing member 20. The sealing member 20 may be made of any material which will not score the groove 25. Spring 28 which may be a resilient member of a segment of a coil spring, urges the sealing member 20 into the groove 25 and additionally, urges the ridges 27 against the ribs 21, thereby assuring that the sealing member 20 will remain rigidly secured to the carrier 10 as the carrier rotates along the screw 13.

Figure 5:
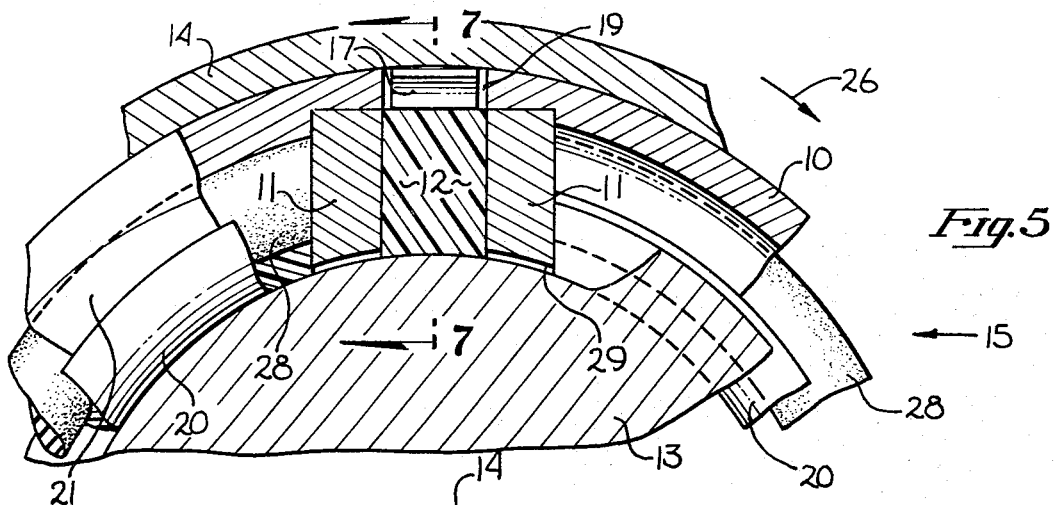
FIG. 5 is a partial exploded cross-sectional view with partially cut-away sections of the screw seal illustrating the portions of the screw seal and screw illustrated within section line 5—5 of FIG. 2.

Referring to FIG. 5, it will be noted that as the screw seal 15 is rotated in the direction indicated by arrow 26 on screw 13 the chipping surface 11 first passes through the groove and chips away all the larger contaminants and foreign matter located on the screw 13. Those contaminants which pass between chipping member 11 and the screw 13 in the space 29 next contact the wiping member 12, which clears the screw 13 of the smaller contaminants and foreign matter. following the wiping member 12 is the sealing member 20 which provides a dynamic seal between the groove of the screw and the carrier 10 since that member is in intimate contact with the screw 13.

As seen in FIG. 5, a second chipping member 11 is located between the wiping member 12 and the sealing member 20. This chipping member is not required but is contained within the presently preferred embodiment of the invention since it has been found that the screw seal may be more easily manufactured when two chipping members 11, which extend into adjacent grooves, are utilized. It will be obvious that only a single chipping member 11, followed by a wiping member 12, both of which extend into a single groove 25 of the screw 13, followed by a sealing member 20, are required to lead the nut 14 as it advances along the screw 13. This is particularly the case where two seal screws are used at opposite ends of the nut such that as the nut is rotated in either direction it is led by first a chipping surface, secondly a wiping surface and thirdly, a sealing member. As previously mentioned, the present preferred embodiment contains two chipping members which extend into two adjacent grooves and a wiping member which also extends into two adjacent grooves since it has been found that this embodiment is more easily manufactured.

In the presently preferred embodiment the sealing member 20 extends helically within the interior of carrier 10 for one turn of the screw upon which it is to be placed. It will be obvious that the sealing member 20 may extend helically within carrier 10 for any number of degrees greater than 360°, thus providing a seal which engages more than one turn of the screw 13. Additionally, it will be obvious that the screw seal 15 may be utilized with any type of screw threads by contouring the chipping member 11, wiping member 12 and sealing member 20 such that these members appropriately engage the thread of the screw.

The screw seal 15 may be utilized by threadingly engaging it on a screw and connecting it to a nut which is engaging the same screw. If a seal is formed between the screw seal and nut the interior of the nut will be kept relatively contaminant free and additional lubricants will be containable between the nut and screw.

Thus, a screw seal has been disclosed which provides a dynamic seal between a nut and a screw and provides means for preparing the screw for accepting a seal by chipping away foreign matter or contaminate on the screw and then wiping the screw before the seal engages the screw. Also, the screw seal performs the function of containing lubricants within the nut as the nut moves along the screw or as the screw moves within the nut.

I claim:

1. A screw seal providing a seal between a screw and a nut comprising:

a carrier defining a cylindrical interior for disposal axially along said screw;

at least one chipping member coupled to said carrier, said member defining a chipping surface which extends into a groove of said screw for engaging matter in said groove as said carrier is advanced along said screw;

at least one wiping member, defining a wiping surface which engages a groove of said screw coupled to said carrier such that said wiping surface follows said chipping surface in a groove of said screw as said carrier is advanced along said screw;

a sealing member helically disposed between said carrier and a groove of said screw for forming a seal between said carrier and said screw, said sealing member being coupled at one of its ends to said carrier such that as said carrier is advanced along said screw said sealing member follows said wiping surface; whereby as said carrier is advanced along said screw foreign matter on said screw is prevented from entering between said seal and said screw.

2. The screw seal defined in claim 1 wherein said sealing member engages at least one groove of said screw for at least one turn of a groove of said screw.

3. The screw seal defined in claim 1 wherein said wiping member defines a surface which engages two adjacent grooves of said screw at its ends.

4. The screw seal defined in claim 1 wherein said chipping member extends radially inward from the interior of said carrier.

5. The screw seal defined in claim 3 wherein a spring is used to urge said wiping member against said screw.

6. The screw seal defined in claim 5 wherein a resilient member is disposed between said sealing member and the interior of said carrier for forcing said sealing member into a groove of said screw.

7. A screw seal providing a seal between a screw and a nut comprising:

a carrier defining a cylindrical interior for disposal axially along said screw;

a pair of spaced apart chipping members coupled to said carrier and extending into the interior of said carrier, each member being disposed parallel to the axis of said screw and including end portions which extend into adjacent grooves of said screw and a center portion disposed above a land of said adjacent grooves;

a wiping member coupled to said carrier between said spaced apart chipping members defining a wiping surface which engages adjacent grooves of said screw for wiping said grooves;

a sealing member for sliding, engaging and sealing the groove of said screw, coupled to the interior of said carrier, said sealing member helically extending from the surface of one end portion of one chipping member opposite said wiping member to a surface on the other chipping member opposite said wiping member in said adjacent groove;

whereby as said screw seal is rotated in either direction on said screw the groove of said screw will first be cleared of matter by said chipping member, then wiped by said wiper and sealed with said carrier by said sealing member.

8. The screw seal defined by claim 7 wherein a spring urges said wiping member against said screw.

9. The screw seal defined by claim 8 wherein the interior of said carrier includes a pair of spaced-apart helical ribs defining a channel for housing a seat for said sealing member.

10. The screw seal defined by claim 9 wherein a resilient member is disposed between said sealing member and carrier within said channels for urging said sealing member into a groove of said screw.

* * * * *